United States Patent [19]
Eberhard et al.

[11] Patent Number: 4,812,944
[45] Date of Patent: Mar. 14, 1989

[54] ELECTRICAL EQUIPMENT

[75] Inventors: Koch U. Eberhard, Ottobrunn; Boettcher Bodo, Zorneding, both of Fed. Rep. of Germany

[73] Assignee: Raychem GmbH, Ottobrunn, Fed. Rep. of Germany

[21] Appl. No.: 927,634

[22] Filed: Nov. 5, 1986

[30] Foreign Application Priority Data

Nov. 8, 1985 [GB] United Kingdom ............... 8527548

[51] Int. Cl.$^4$ .............................................. H02H 1/04
[52] U.S. Cl. .................................. 361/127; 361/117; 361/124
[58] Field of Search ............... 361/110, 111, 117, 118, 361/119, 124, 127

[56] References Cited

U.S. PATENT DOCUMENTS

| | | | |
|---|---|---|---|
| 3,568,311 | 3/1971 | Lawton | 29/624 |
| 4,015,228 | 3/1977 | Eda et al. | 361/124 X |
| 4,240,124 | 12/1980 | Westrom | 361/127 |
| 4,262,318 | 4/1981 | Shirakawa et al. | 361/127 |
| 4,298,900 | 11/1981 | Adveenko et al. | 361/127 |
| 4,306,267 | 12/1981 | Yanaba et al. | 361/127 |
| 4,326,232 | 4/1982 | Nishiwaki et al. | 361/127 |
| 4,424,527 | 12/1980 | Titus et al. | 361/127 |
| 4,456,942 | 6/1984 | Bronikowski | 361/127 |
| 4,484,247 | 11/1984 | Koch et al. | 361/127 |
| 4,656,555 | 4/1987 | Raudabaugh | 361/117 |

FOREIGN PATENT DOCUMENTS

| | | |
|---|---|---|
| 0008181 | 2/1980 | European Pat. Off. |
| 0147978 | 7/1985 | European Pat. Off. |
| 655744 | 8/1951 | United Kingdom |
| 928566 | 6/1963 | United Kingdom |
| 1430079 | 3/1976 | United Kingdom |
| 2021857 | 12/1979 | United Kingdom |
| 2050719 | 1/1981 | United Kingdom |
| 1583913 | 2/1981 | United Kingdom |
| 2073965 | 10/1981 | United Kingdom |

Primary Examiner—A. D. Pellinen
Assistant Examiner—Derek S. Jennings
Attorney, Agent, or Firm—Edith A. Rice; Herbert G. Burkard

[57] ABSTRACT

A surge arrestor comprises at least one surge arresting element mounted between a pair of electrodes. The assembly is secured together longitudinally by a plurality of heat recoverable polymeric strands, and is contained within a heat recoverable shedded polymeric housing of electrically insulating and non-tracking material.

12 Claims, 2 Drawing Sheets

ELECTRICAL EQUIPMENT

BACKGROUND OF THE INVENTION

DESCRIPTION

This invention relates to electrical equipment, and in particular to surge arrestors. The invention also relates to a packing arrangement.

Surge arrestors are used in the electrical power industry for limiting the magnitude of surge voltages, due for example to lightning strikes, between two points of a power system at different electrical potentials. Typically, a surge arrestor is of generally cylindrical configuration and may comprise a non-linear resistor arrangement formed from a plurality, that is to say two or more, of metaloxide, for example zinc oxide, varistor blocks stacked end-to-end, having a conductive plate, or other surface, at each end to form a pair of electrodes. The resistor arrangement and electrodes are mounted within and retained by a housing. The housing is of insulating material, advantageously having good resistance to tracking, that is to say good resistance to the formation of carbonaceous paths along its surface, and advantageously has good resistance to environmental contaminants such as water, salts and acids. Advantageously, the outer surface has a shedded or convoluted configuration, thereby increasing the creepage path length end-to-end. Porcelain is a good and commonly-used material for surge arrestor housings, being disclosed for example in UK Patent Publication No. 2050719A, but although porcelain has very good electrical and environmental properties, it does have the disadvantage of resulting in a relatively heavy structure. UK Patent Publication No. 2073965B discloses a surge arrestor in which the housing is provided by an antitracking heat shrinkable polymeric material, which provides a considerable weight saving with respect to procelain. However, a porcelain housing serves the further function of being strong enough to retain the surge arresting blocks mechanically. In this latter respect, it is pointed out that the electrical surge that can pass through the surge arrestor in operation, and particularly in an overload condition, can give rise to severe mechanical forces that tend to urge the surge arresting elements longitudinally apart. This tendency is overcome in conventional porcelain surge arrestors by having a spring urge the elements together, the arrangement of elements and spring being held in compression between the electrodes by fixing them to the housing, which in the case of procelain is strong and rigid enough to withstand the reaction forces. A porcelain housing is consequently subject to explosive shattering in extreme cases, even despite the provision of a rupturable pressure-relieving diaphragm, a problem which does not arise with a surge arrestor having a polymeric housing, which is thus inherently safer. A polymeric housing, however, particularly when the polymeric material is made thin enough to be heat-recoverable, does not have the mechanical strength of procelain. In one known configuration of a surge arrestor having a polymeric housing, the surge arresting elements are formed as rings rather than solid discs, and a fibreglass rod extends axially through the rings and is threaded into an electrode at each end of the stack of discs so as longitudinally to compress them. However, this configuration gives rise to an air-filled channel extending between the electrodes, which produces mechanical weakness in the surge arrestor and also is undesirable electrically.

SUMMARY OF THE INVENTION

It is an object of the present invention to provide a surge arrestor that overcomes, or at least alleviates the above-mentioned problems associated with known surge arrestors.

It is another object of the present invention to provide a packing arrangement for securing together a plurality of elements that are mounted end-to-end, which elements may or may not comprise surge arresting elements.

In accordance with one aspect of the present invention, there is provided a surge arrestor comprising at least one surge arresting element mounted between two electrode members, and a plurality of spaced-apart compression members located around the electrode members and the element, said compression members being recoverable and arranged on recovery to exert a compressive force on the electrode members so as to urge them towards said at least one surge arresting element.

UK Patent Specification Nos. 655744, 928566 and 1583913, and U.S. Pat. No. 4,326,232, relate to surge arrestors, and each discloses a rigid mechanical longitudinal clamping, as by bolts for example, of surge arresting elements.

The electrode members may be planar members mounted directly on opposite ends of a single surge arresting element, or at respective ends of a stack of elements when mounted end-to-end. In general, the surge arrestor may have a plurality of surge arresting elements, that is to say two or more, the precise number depending on the operating voltage of the surge arrestor. Typically, the arrestor would be arranged to have one surge arresting element per 1 to 5 kV of its operating voltage. The electrode members may themselves form the external electrodes of the surge arrestor or may be electrically connected thereto, for example by a resilient member such as a spring or by an extension block that is required to give the surge arrestor a desired length.

The surge arresting elements may be of generally cylindrical configuration, the cylinder being circular or rectilinear in cross-section for example. The elements may be metal oxide varistor elements, for example zinc oxide elements, or any other suitable components.

The surge arrestor of the present invention preferably has a housing, which may be of polymeric material and preferably is recoverable, for example by heat, towards, for example on to, the surge arresting elements. Preferably, the housing is generally cylindrical, but may advantageously have a shedded outer configuration, that is to say, have therealong one or more sheds extending outwardly so as to increase the creepage current path length of the arrestor and to direct water or other liquid contamination away from its outer surface. The sheds may or may not be integral with a cylindrical tube that constitutes the housing. Such a housing has the low weight and safety features referred to above associated with polymeric material, whilst the longitudinal retention of the surge arresting elements is achieved by separate means that can, for example, form a cage-like structure around the elements thereby to exert a longitudinal compressive force thereon. The housing, when provided, is of electrical insulation material, and preferably is substantially non-tracking and has good resistance to environmental contaminants.

The recoverable compression members may be provided by discrete components such as rods, or tapes, or strands (such as fibres), and these may advantageously extend between and be secured to retaining members located at respective ends of the surge arresting elements. Alternatively, a single strand, fibre, or tape may be would back and forth between the retaining members around the periphery of the surge arresting elements, the individual compression members then comprising spaced-apart portions thereof. Tapes or strands are preferred, since their flexibility facilitates assembly of the whole surge arrestor, whilst their recoverability provides the necessary axial compression in the final article. the retaining members may be, or form part, of the electrodes of the surge arrestor.

In a preferred embodiment, the recoverable compression members, for example heat recoverable members, are formed from polymeric material that has high strength and that produces a high recovery force. Particularly suitable materials, by way of example, are oriented poly (aryl ether) ketones and ultra high molecular weight (that is to say greater than about three million) polyethylene. Oriented ketones and their method of manufacture are disclosed, for example, in UK Patent Publication Nos. 1383393B, 1387303B, 1388013B, 1471171B, 1567190B, and 2138433A, and high strength polyethylene material and its method of manufacture are disclosed, for example, in European Patent Publication No. 153199A. However, other recoverable materials that are capable of exerting a sufficient axial force may also be used.

A recoverable article is an article the dimensional configuration of which may be made to change appreciably when subjected to the appropriate treatment. The article may be heat-recoverable such that the dimensional configuration may be made to change when subjected to a heat treatment. Usually these articles recover, on heating, towards an original shape from which they have previously been deformed but the term "heat-recoverable", as used herein, also includes an article which, on heating, adopts a new configuration, even if it has not been previously deformed.

In their most common form, such articles comprise a heat-shrinkable sleeve made from a polymeric material exhibiting the property of elastic or plastic memory as described, for example, in U.S. Pat. Nos. 2,027,962; 3,086,242 and 3,597,372. As is made clear in, for example, U.S. Pat. No. 2,027,962, the original dimensionally heat-stable form may be a transient form in a continuous process in which, for example, an extruded tube is expanded, whilst hot, to a dimensionally heat-unstable form but, in other applications, a preformed dimensionally heat stable article is deformed to a dimensionally heat unstable form in a separate stage.

The polymeric material may be cross-linked at any stage in its production that will enhance the desired dimensional recoverability. One manner of producing a heat-recoverable article comprises shaping the polymeric material into the desired heat-stable form, subsequently cross-linking the polymeric material, heating the article to a temperature above the crystalline melting point or, for amorphous materials the softening point, as the case may be, of the polymer, deforming the article and cooling the article whilst in the deformed state so that the deformed state of the article is retained. In use, since the deformed state of the article is heat-unstable, application of heat will cause the article to assume its original heat-stable shape.

In other articles, as described, for example, in British Pat. No. 1,440,524, as elastomeric member such as an outer tubular member is held in a stretched state by a second member, such as an inner tubular member, which, upon heating weakens and thus allows the elastomeric member to recover.

The surge arrestor may additionally be provided with a resilient member, such as a compression spring, acting on one or each end of the plurality of surge arresting elements, to enhance the compressive force on the surge arresting elements. It will be appreciated that due to the compression members being recoverable, the longitudinal compressive force is exerted on recovery and that provided full recovery of the members does not take place, a compressive force will continue to be exerted on the surge arresting elements, resisting any tendency for them to move apart longitudinally. The resilient member can, however, be included in the surge arrestor so as continuously to exert a longitudinal compressive force on the elements, even should there be some relaxation of the compression members themselves.

In accordance with a further aspect of the present invention, there is provided a packing arrangement comprising a plurality of elements mounted end-to-end, and a plurality of recoverable members disposed peripherally around the elements and arranged on recovery to urge the elements into contact with one another longitudinally.

It will be appreciated that the recoverable members may be the recoverable compression members hereinbefore discussed.

The elements of the packing arrangement may be surge arresting elements, other electrical or non-electrical components. In any case, the recoverable members will serve to hold the elements together longitudinally and peripherally, for example circumferentially.

BRIEF DESCRIPTION OF THE DRAWING

A surge arrestor and a packing arrangement, each in accordance with the present invention, will now be described, by way of example, with reference to the accompanying drawings, in which.

DESCRIPTION OF THE PREFERRED EMBODIMENT

Figure 1:
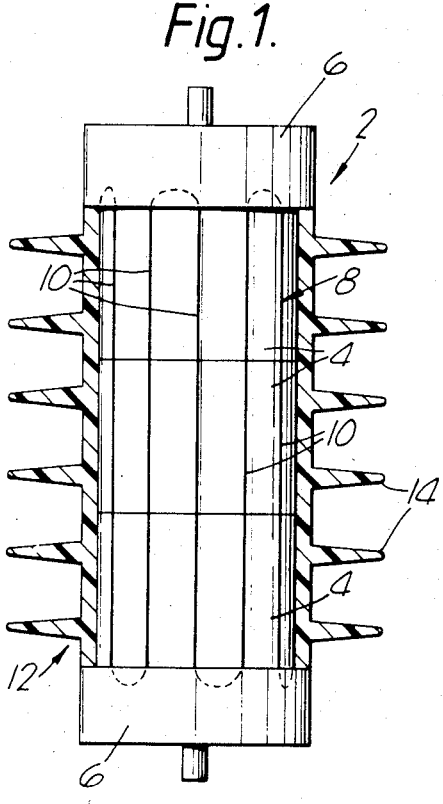
FIG. 1 is a side elevation of a first embodiment of a surge arrestor.

Referring to FIG. 1 of the drawings, a generally cylindrical surge arrestor 2 has three zinc oxide surge arresting elements or blocks 4 disposed between two end electrodes 6.

A single electrically insulating heat-recoverable fibre 8 of oriented poly (aryl ether) ketone extends back and forth between the electrodes 6 and circumferentially around the stack of blocks 4. The fibre 8 is secured by any suitable means to the electrodes 6 each time it comes into contact therewith. In this way, spaced apart sections 10 five of which are shown) of the fibre 8 extend around the blocks 4 and are secured at each of their ends to the electrodes 6. The fibre 8 has a high recovery force, and on recovery under the action of heat, the sections 10 tend to shrink and thus act to urge the electrodes 6 towards each other, exerting a compressive force on the blocks 4. This force ensures that the blocks 4 remain in contact with each other and with the electrodes 6 in operation of the surge arrestor.

A heat-recoverable sleeve 12 of electrically insulating and anti-tracking polymeric material is recovered into conformity with the blocks 4. The sleeve 12 is of generally cylindrical configuration with a plurality of sheds 14 extending therefrom. The sleeve 12 thus provides an outer covering for the surge arrestor 2 that protects it electrically and also mechanically.

The single fibre 8 may be replaced by a plurality of individual fibres that extend between the electrodes 6. In a further modification, the fibre, or fibres, may be replaced by a tape, or tapes, having longitudinal recovery.

Figure 2:
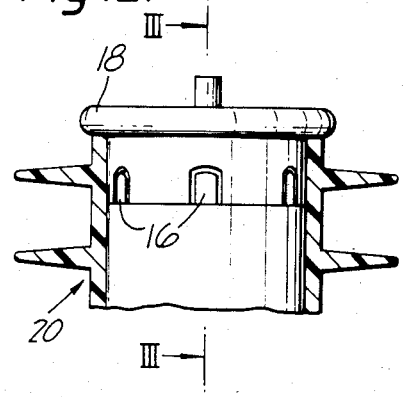
FIG. 2 is a side elevation of a portion of a second embodiment of a surge arrestor.
Figure 3:
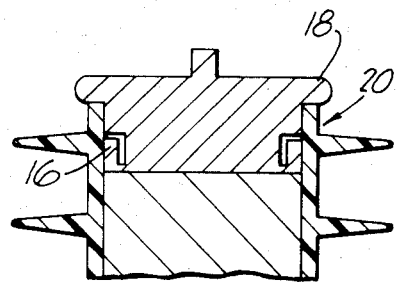
FIG. 3 is a section along the line III—III of FIG. 2.

FIGS. 2 and 3 shown one suitable arrangement for securing a compression member, such as a section 10 of FIG. 1, to an electrode of a surge arrestor. A plurality of hooks 16 are formed integrally with the metal electrode 18, such that loops of a recoverable fibre or tape (not shown), can be passed thereover between the sections that enclose the metal oxide blocks (not shown). Advantageously, the outer protection sleeve 20 (FIG. 3) extends longitudinally sufficiently far to overlap the hooks 16.

Figure 4:
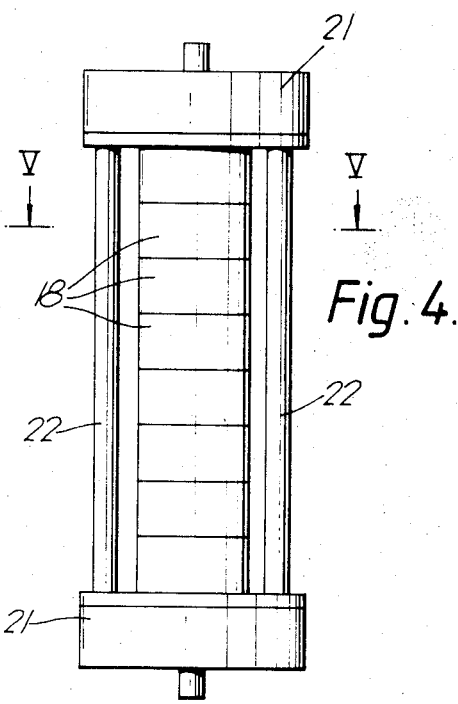
FIG. 4 is a side elevation of a third embodiment of a surge arrestor.
Figure 5:
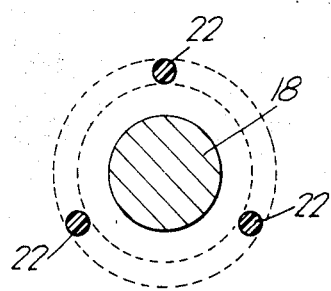
FIG. 5 is a section along the line V—V of FIG. 4.

In the embodiment of FIGS. 4 and 5, eight zinc oxide disc-shaped surge arresting blocks 18 are located between a pair of disc-shaped electrodes 20. Three rods 22 are equispaced around, and radially spaced apart from, the stack of blocks 18, and are secured at each of their ends to the electrodes 20. The rods 22 are formed of heat-recoverable ultra high molecular weight polyethylene, and after mounting in position are heated such that they shrink longitudinally thus exerting the desired high axial compressive force between the electrodes 20 on the blocks 18.

Figure 6:
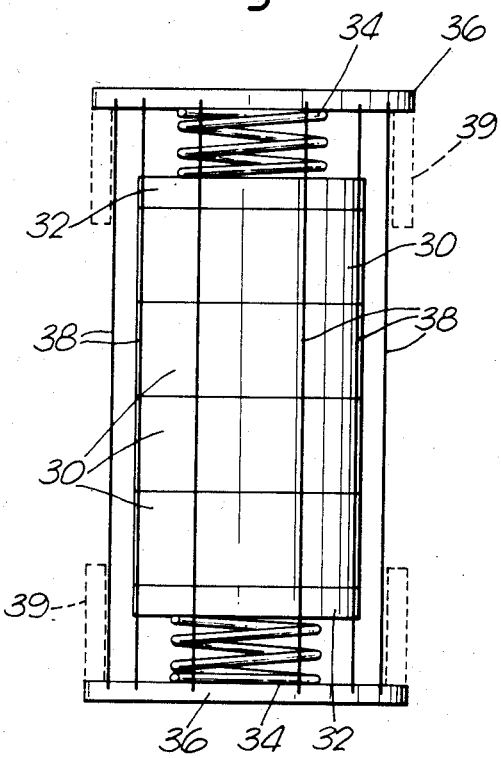
FIG. 6 is a side elevation of a fourth embodiment of a surge arrestor.

Referring to FIG. 6, a stack of cylindrical metal oxide surge arresting blocks 30 is mounted between electrodes 32 of a surge arrestor. A compression spring 34 bears on the outer surface of each electrode 32, and abuts an outermost pressure plate or disc 36. Electrically insulating strands 38 are secured at each end to the plates 36 and extend therebetween circumferentially around the blocks 30. The strands 38, which are recoverable, are tensioned on recovery so as to compress the springs 34 and thus exert an axial compressive force on the blocks 30 and electrodes 32. The strands 38 may form part of a single integral strand, or alternatively the strand compression members may be provided by one or more recoverable tapes or rods as discussed with reference to previous embodiments.

Advantageously, each plate 36 can be extended by a cylindrical skirt 39 as shown by the broken line in FIG. 6, so as to enclose the spring 34, electrode 32 and the region where the fibres 38 are connected to the plate 36.

Figure 7:
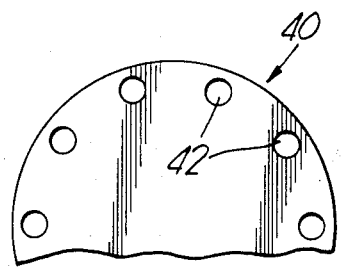
FIGS. 7 and 8 show in plan two embodiments of part of the surge arrestor of FIG. 6.
Figure 8:
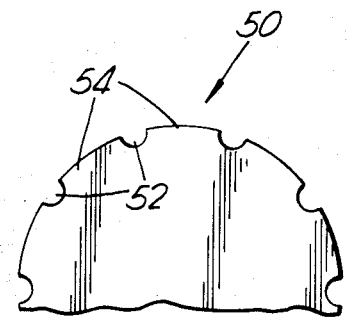

FIGS. 7 and 8 show part of plates or discs 40 and 50 respectively suitable for use as the discs 36 of FIG. 6. Disc 40 is apertured at 42 to allow a fibre, strand or rod to pass therethrough and be secured thereby, whilst disc 50 has peripheral slots 52 that define projections or teeth 54 to which the compression members can be secured.

It is to be understood that an outer protective housing, such as an insulating, and preferably non-tracking and environmental-resistant, heat recoverable polymeric and preferably shedded housing, is to be provided as part of each of the surge arrestors described with reference to the drawings. Furthermore, additional longitudinal compression of the surge arrestor elements in any of the embodiments herein disclosed may be provided by mechanical means such as for example the compression spring 34 at one or each end of the stack of elements.

We claim:

1. An elongated surge arrestor comprising at least one surge arresting element mounted between two electrode members, so as to extend in a longitudinal direction, and a plurality of elongated recoverable polymeric compression members, in which said compression members extend in said longitudinal direction from one of said electrode members to the other of said electrode members and lie around said at least one surge arresting element and said two electrode members at circumferentially spaced-apart locations in non-overlapping relationship with each other, and in which the recovery of said recoverable polymeric compression members is arranged to exert a compressive force in said longitudinal direction on said electrode members so as to urge said electrode members towards said at least one surge arresting element.

2. A surge arrestor according to claim 1, wherein the compression members are heat recoverable.

3. A surge arrestor according to claim 1, wherein the compression members comprise high recovery force polymeric material.

4. A surge arrestor according to claim 1, wherein said compression members comprise at least one strand, tape or rod.

5. A surge arrestor according to claim 1, comprising a plurality of said surge arresting elements mounted end-to-end, with said two electrode members disposed at opposite ends thereof.

6. A surge arrestor according to claim 1, comprising at least one resilient member that is subject to the compressive force of the compression members and that acts on said at least one surge arresting element.

7. A surge arrestor according to claim 1, wherein said at least one surge arresting element is disposed within a polymeric housing.

8. A surge arrestor according to claim 7, wherein the housing is of shedded outer configuration.

9. A surge arrestor according to claim 7, wherein the polymeric housing is recoverable.

10. A surge arrestor according to claim 3, in which said polymeric members comprises materials selected from oriented poly(aryl ether) ketones and ultra high molecular weight polyethylene.

11. An elongated packing arrangement comprising at least three electrical components mounted end-to-end in a longitudinal direction having a first of said components at one end and a last of said components at the other end, and a plurality of elongated recoverable compression members, in which said compression members extend in said longitudinal direction from said first component to said last component and lie around all of said components at circumferentially spaced-apart locations in non-overlapping relationship with each other, and in which the recovery of said recoverable polymeric compression members is arranged to exert a compressive force in said longitudinal direction on said first and said last electrical components so as to urge all of said electrical components together.

12. An arrangement according to claim 11, wherein the recoverable members comprise at least one strand, tape or rod.

* * * * *